(12) United States Patent
Wu et al.

(10) Patent No.: US 6,992,658 B2
(45) Date of Patent: Jan. 31, 2006

(54) METHOD AND APPARATUS FOR NAVIGATION, TEXT INPUT AND PHONE DIALING

(75) Inventors: Charles Wu, Palo Alto, CA (US); Jin Guo, Sunnyvale, CA (US); Lu Chang, Cupertino, CA (US); Carlos McEvilly, Redwood City, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/285,258

(22) Filed: Oct. 31, 2002

(65) Prior Publication Data

US 2003/0048262 A1 Mar. 13, 2003

(51) Int. Cl.
*G09G 5/00* (2006.01)
*G06K 11/06* (2006.01)

(52) U.S. Cl. ............... 345/169; 345/157; 345/173; 178/18.01

(58) Field of Classification Search ............... 345/156, 345/157, 158, 163, 167, 168, 169, 173, 174, 345/175; 178/18.01, 18.03, 18.06
See application file for complete search history.

(56) References Cited

U.S. PATENT DOCUMENTS

| | | | | |
|---|---|---|---|---|
| 4,044,242 A | | 8/1977 | Laesser | 235/152 |
| 5,559,512 A | * | 9/1996 | Jasinski et al. | 341/22 |
| 5,982,303 A | | 11/1999 | Smith | 341/22 |
| 6,107,997 A | * | 8/2000 | Ure | 345/173 |
| 6,239,790 B1 | * | 5/2001 | Martinelli et al. | 345/174 |
| 6,339,643 B1 | * | 1/2002 | Mastrocola et al. | 379/433.06 |
| 6,518,957 B1 | * | 2/2003 | Lehtinen et al. | 345/173 |
| 6,681,002 B2 | * | 1/2004 | Chang | 379/93.27 |
| 6,682,235 B2 | * | 1/2004 | Monney et al. | 400/472 |
| 2001/0038382 A1 | * | 11/2001 | Griffin et al. | 345/169 |
| 2003/0095096 A1 | * | 5/2003 | Robbin et al. | 345/156 |
| 2003/0201982 A1 | * | 10/2003 | Iesaka | 345/168 |

FOREIGN PATENT DOCUMENTS

| | | |
|---|---|---|
| WO | WO 97/21295 | 6/1997 |
| WO | WO 00/34965 | 6/2000 |
| WO | WO 00/72300 | 11/2000 |
| WO | WO 01/45035 | 6/2001 |

* cited by examiner

*Primary Examiner*—Sumati Lefkowitz
*Assistant Examiner*—Alecia D. Nelson

(57) ABSTRACT

An apparatus and a method for entering information into an electronic device are provided. The apparatus (200) includes five text-input buttons (102, etc) that can be activated by pressing or by touching. In one embodiment, the buttons are located on a disk (302). Text is entered by pressing or touching a single text-input button and then passing a finger or thumb over additional buttons in a prescribed order. The apparatus may be used in conjunction with additional input devices, such as an 'accept' or 'OK' button. Four navigation buttons (104, etc) are also provided. In one embodiment, these are additional buttons. In a further embodiment, four of the five text-input buttons are selectable as navigation buttons. The selection may be achieved by rotation of the disk (302) on which the buttons are located. The apparatus may also include a rotatable wheel or roller (108) to permit scrolling through lists. The apparatus may be used to enter navigation (command), text or number information.

24 Claims, 4 Drawing Sheets

METHOD AND APPARATUS FOR NAVIGATION, TEXT INPUT AND PHONE DIALING

FIELD OF THE INVENTION

This invention relates generally to the field of user interfaces for electronic devices. More particularly, this invention relates to a user interface for entering navigation, text and numeric information into a handheld device.

BACKGROUND OF THE INVENTION

Alpha-numeric information from a user of an electronic device is conventionally entered using a digital keypad or keyboard. Handheld devices, such as cellular telephones already have limited space for a keypad. As the functionality of handheld devices increases, the space constraint is made more severe by the use of larger display screens. Handheld devices tend to have bigger display screens for increased viewing pleasure while maintaining the same palm-size form factor for good portability. As a result, the space taken up by operational tools tends to be reduced to accommodate the larger display screen. This trend is evidenced in the contemporary design of cellular phones, where the space for keypad and buttons has been reduced significantly to make room for the increasingly bigger display screen. For handheld devices with a touch sensitive screen, most operations have moved to the display area where they are accessed through software, hence, there are not many hardware control components left on the device body. However, the majority of handheld devices in the marketplace still tend to have non-touch-sensitive screens for cost, durability, power saving and various reasons. On these types of devices, operations are inevitably done through hardware components. Thus, they have to take up space on the device body. Therefore, the designer is faced with the challenge of making the operation tools as small as possible while still keeping the versatility of those tools.

There is a limit to how much the space for operational usage can be reduced. If the space becomes too tiny, it would make the thumb and finger operation difficult, if not entirely impossible. On the other hand, the designer cannot sacrifice the versatility of operational tools only for the sake of making it comfortable to use. All of the operational functions must be retained, no matter how much the size of the tools is reduced.

Most basic operations on handheld devices fall into three main categories: navigation and control, text input and phone dialing.

For navigation and control functions, the conventional 4-direction navigation method has been widely used. Some implementations are done using a dedicated 4-directional button, like Motorola's Timeport P935 Personal Interactive Communicator (PIC or 2-way pager); others use a combination of navigation roller and button, like Nokia's 7110 series of cellular phone; while others are implemented on keys, like Motorola's Timeport P8767 cellular phone. In addition, a data entry device is disclosed in U.S. patent application Ser. No. 09/4655789, "Chart Navigation Using Compact Input Devices", filed Dec. 17, 1999.

For text input, most handheld devices depend on the standard keypad, like Motorola's iTAP text input system on V8088 cellular phones, others use a shrunk version of the QWERTY keyboard, like Motorola's Timeport P935 PIC, often accompanied by other auxiliary buttons or keys. There exist various designs of text input devices employing a set of 8 or 9 keys. These keys can be a subset of the keys on a standard keypad or can be a separate set of dedicated keys or buttons. In addition, a data entry device is disclosed in co-pending U.S. patent application Ser. No. 09/317,518, "Data Entry Device Recording Input in Two Dimensions", filed May 24, 1999.

Prevailing methods for phone dialing rely on the standard keypad for phone number entering. There exist other designs employing special control mechanisms for phone number entering as well as for text input. However, none of the methods mentioned above provide an integrated solution to meet user's need of one set of keys or tools for all 3 major operational functions. In other words, for each individual function, a user has to select a separate set of control keys or tools to perform the task. This way of operation requires a larger space on the device than would otherwise be comfortable for normal thumb-and-finger operation.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION OF THE INVENTION

Figure 1:
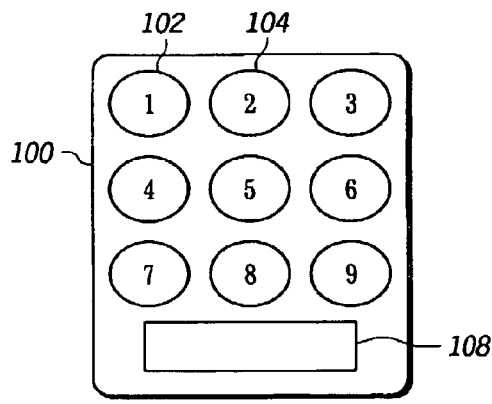
FIG. 1 is a diagram of an operational interface in accordance with a first embodiment of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention relates to an interaction device that allows a user to provide control, navigation and text input to an electronic device. The device has application to cellular telephones, remote control units, two-way radios and other handheld devices. The device provides single-handed operability, a single focal point and appropriate haptic feedback.

FIG. 1 shows a first embodiment of an apparatus 100 of the invention. Nine buttons, 102, 104, etc, are arranged at positions 1–9. Each button is responsive to touch and to pressure. A variety of touch sensitive sensors are known in the art, including optical, capacitive, inductive and resistive sensors. The sensor generates a signal as a finger, thumb or other object is moved across the sensor. The buttons are also sensitive to pressure. They may use, for example, mechanical, piezoelectric or other pressure switches known in the art. In the embodiment shown in FIG. 1, the 9 buttons are arranged in a square grid pattern, however, other arrangements may be used. The embodiment also includes a scrolling device 108. The scrolling device may be a roller that produces a signal that is representative of the absolute or relative position of the roller, or it may be a touch sensitive pad that produces a signal dependent upon the position of a finger or thumb on the pad. The scrolling device may also be a joystick. Preferably, the scrolling device also functions as a button and produces a signal when 'clicked'.

Preferably, all of the buttons produce a mechanical feedback to the user when pressed.

Figure 2:
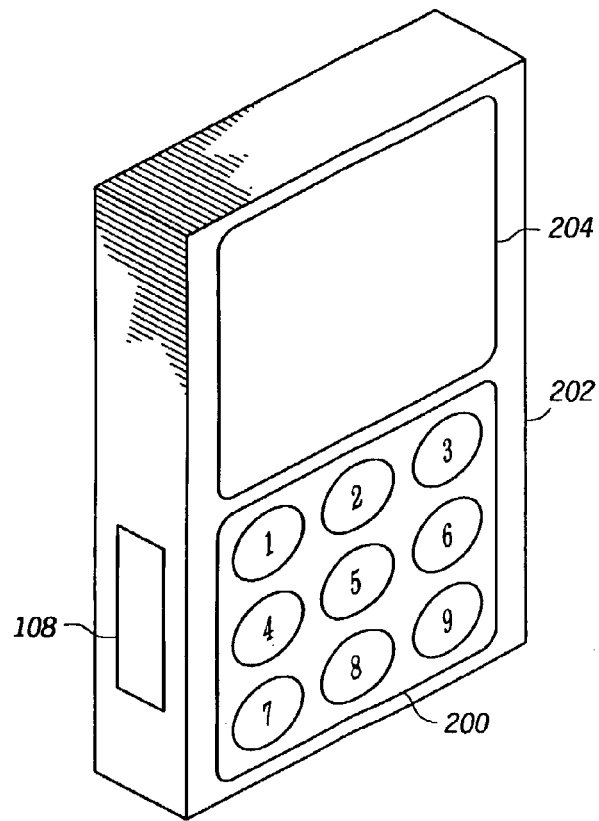
FIG. 2 is a diagram of an operational interface in accordance with a second embodiment of the present invention.

FIG. 2 shows a further embodiment of the apparatus 200 incorporated into a handheld electronic device 202. The electronic device includes a digital processor (not shown), a memory (not shown) and a display 204. In this embodiment, the scrolling device 108 is a side-wheel, positioned on a different face of the handheld electronic device. This allows for an increased screen size.

According to the method of the invention, the apparatus 100 may be used in a number of distinct modes.

In a first mode, the scrolling device is used to scroll through a list of items and to select items from the list. This mode may be used for entering numbers or for entering characters.

In a second mode, only the buttons at positions 2, 4, 6 and 8 are activated. These are the buttons located at the compass points north, south, east and west. In this mode the buttons are used to navigate on the display. These buttons will be called navigation buttons. For example, the buttons may be used to move a cursor on the display. In this mode, the other buttons may be disabled, either physically or in software. In one embodiment, active buttons may be illuminated more brightly than disabled buttons.

In a third mode, only the buttons 1, 3, 5, 7 and 9 are activated. In this mode, the buttons are used for entering text and characters. These buttons will be called text-input buttons in the sequel. To enter a letter, a specified button is pressed and then a finger or thumb is moved over one or more additional buttons in a prescribed order. As an alternative to pressing the first button of a sequence, the time interval between button touches may be monitored. If no button has been pressed or touched for a period of time, the next button touch is taken to be the start of a new letter input. Preferably, the shape of the path traveled by the finger or thumb is related to the shape of the letter. Since, at most, only a single button press is needed, this method of text entry is faster than prior methods that require multiple button presses to enter characters. In this mode of operation, the other buttons may be disabled, either physically or in software. This reduces the chance of input errors.

In a fourth mode, the buttons may be pressed to enter numbers into the electronic device 202. This mode may be used for entering numbers to be dialed, or for an electronic calculator for example.

Many other button configurations will be apparent to those of ordinary skill in the art.

Figure 3:
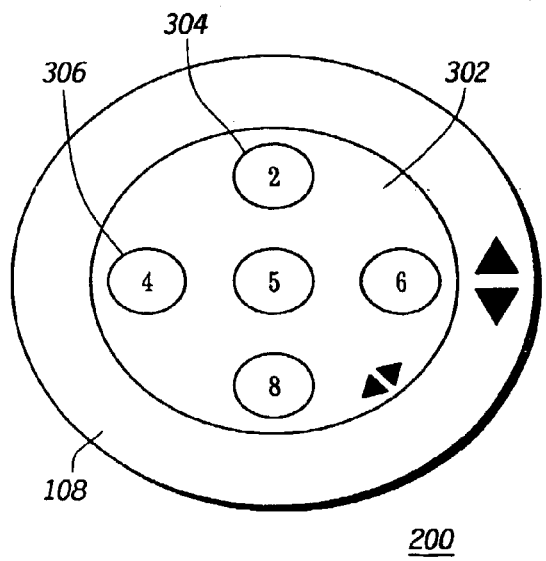
FIG. 3 is a diagram of an operational interface in accordance with a third embodiment of the present invention in a first configuration.

A further embodiment of the present invention is shown in FIG. 3. The apparatus 200 in FIG. 3 comprises a circular disk 302 on which are located five buttons (304, 306, etc). The buttons are located at positions 2, 4, 5, 6 and 8. Encircling the disk 302 is a scrolling device 108 in the form of a ring. In one embodiment, the ring may be physically rotated to generate a signal related to the absolute or relative position of the ring. In a further embodiment, the ring is touch sensitive and generates a signal related to the position of a finger or thumb on the ring. This outer ring serves as an encoding wheel. Rotation of the ring-shaped roller can be programmed to move a screen cursor and select items from a list or to move a screen cursor and select numbers from a representation of a rotary telephone dialer displayed on a screen. The outer ring can also be used, for example, to set time or a clock displayed on the screen.

Figure 4:
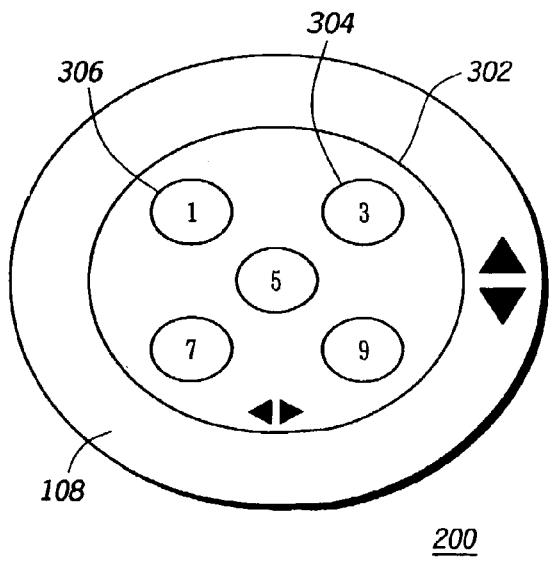
FIG. 4 is a diagram of an operational interface in accordance with a third embodiment of the present invention in a second configuration.

In this arrangement of the buttons, called a "cross" or "diamond" arrangement, the buttons may be used for navigation as described above. The disk may be physically rotated about its center, as shown in FIG. 4, so that button 304 moves from position 2 in FIG. 3 to position 3 in FIG. 4 and button 306 moves from position 4 to position 1. In this arrangement of the buttons, called a "square" arrangement, the buttons may be used for entering text as described above.

The mode of operation of the apparatus is dependent upon the orientation of the disk. In particular, the orientation determines whether the second or third mode of operation, described above, is activated.

In one embodiment of the invention, the disk 302 may be moved in the plane of the disk to one of a number of positions. The mode of operation of the apparatus is dependent upon the position of the disk.

Figure 5:
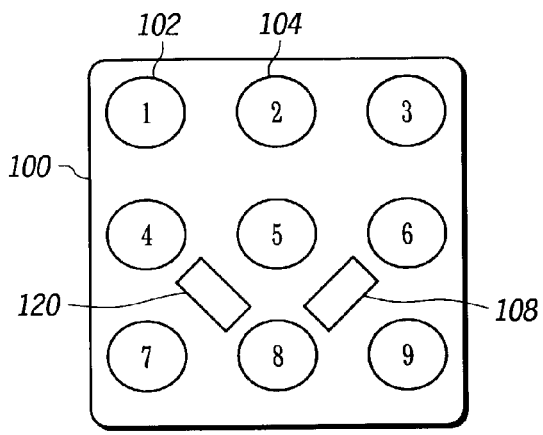
FIG. 5 is a diagram of an operational interface in accordance with a fourth embodiment of the present invention.
Figure 6:
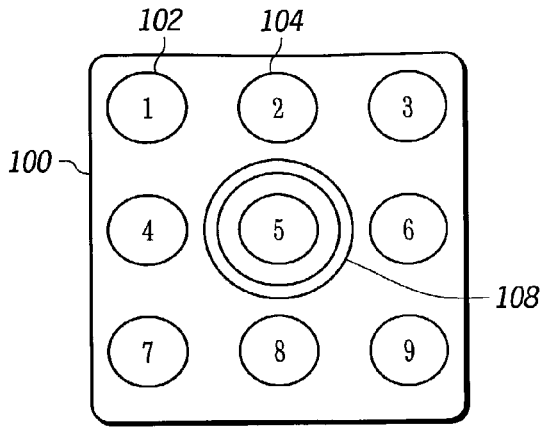
FIG. 6 is a diagram of an operational interface in accordance with a fifth embodiment of the present invention.

Many other configurations will be apparent to those of ordinary skill in the art. Examples of further embodiments are shown in FIG. 5 and FIG. 6. In FIG. 5, a wheel-type scrolling device 108 is located within the group of buttons (102, 104 etc). The axis of the wheel is substantially in the plane of the button grid. Additional wheels may also be added, such as 120 in FIG. 5. This maintains the symmetry of the device making it suitable for both left- and right-handed users. In the embodiment shown in FIG. 6, a ring-type scrolling device 108 is incorporated within the group of buttons.

Figure 7:
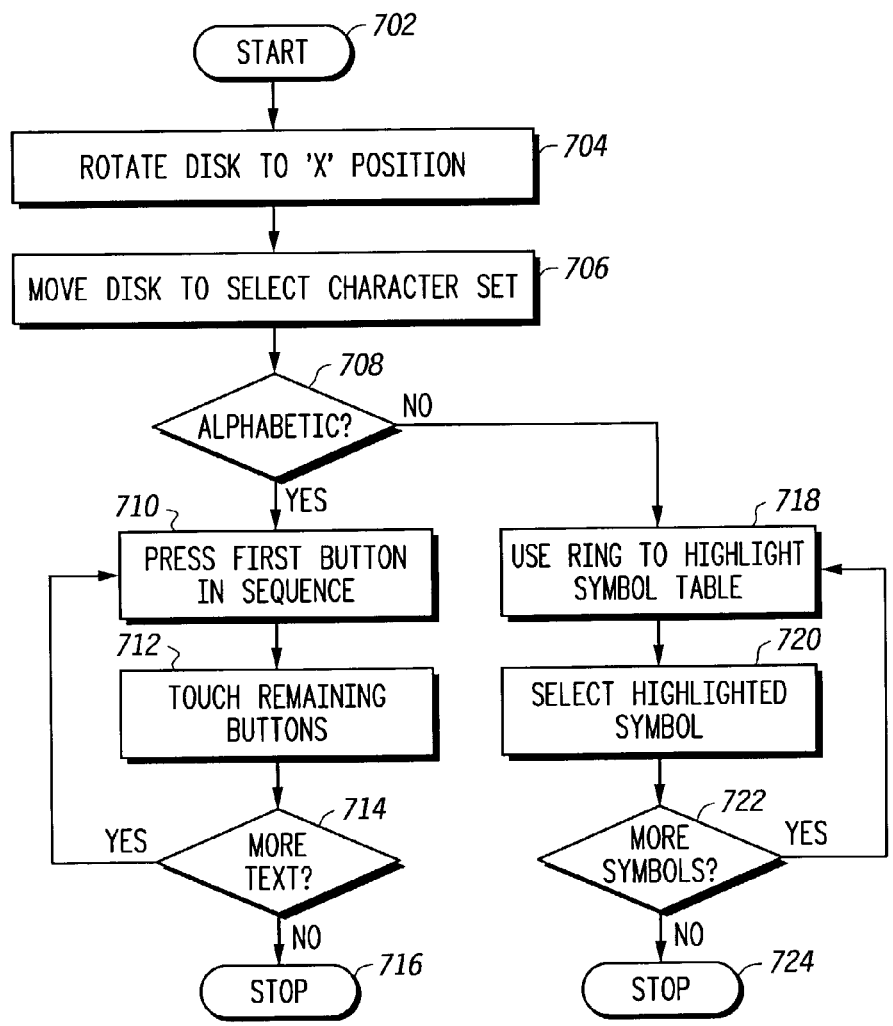
FIG. 7 is a flow chart depicting a method of entering text into an electronic device in accordance with the present invention.
Figure 8:
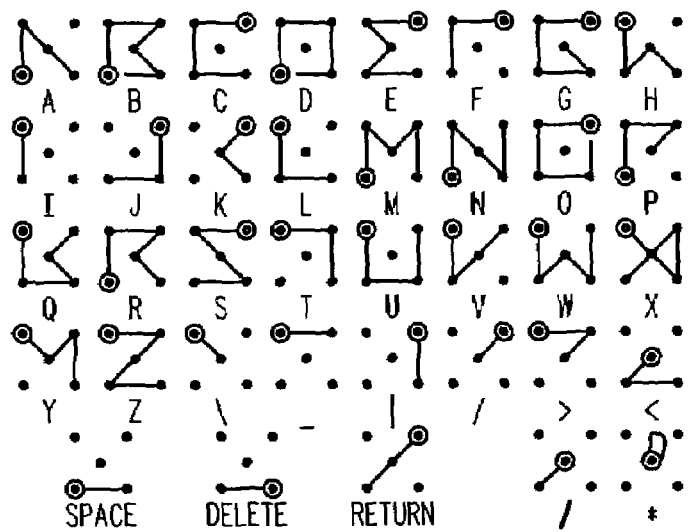
FIG. 8 is a table of diagrams depicting an exemplary set of key sequences for entering text into an electronic device.

FIG. 7 is a flow chart depicting a method for entering text into an electronic device in accordance with one embodiment of the present invention. Referring to FIG. 7, following start block 702, the disk 302 of the apparatus shown in FIG. 3 and FIG. 4 is rotated at block 704 to the position shown in FIG. 4. This is the "cross" or "square" position. At block 706, the character set is selected, either by moving the disk in a horizontal direction or by other selection means. If alphabetic letter input is selected, as depicted by the positive branch from decision block 708, the buttons are used to enter a letter. In alternative embodiments, such as that shown in FIG. 1 for example, the buttons at locations 1, 3, 5, 7 and 9 are selected in software and the other buttons are disabled when letter input is selected. At block 710 a button is pressed to denote the start of a new letter input. Alternatively, the time interval between button touches may be monitored. If no button has been pressed or touched for a period of time, the next button touch is taken to be the start of a new letter input. At block 712, the user touches a sequence of buttons (without pressing them) that corresponds to the letter. An exemplary set of sequences is shown in FIG. 8. The circled button denotes the starting button that is pressed at 710 to indicate the start of a new letter. The lines denote the sequence of buttons that are touched to indicate a chosen letter. For example, the letter "D" is entered at block 712 by pressing button 7 and then touching buttons 1, 3, 9, and 7 in sequence. Letter "S" is entered by pressing button 3 and then touching buttons 1, 5, 9 and 7 in sequence. Once the apparatus recognizes a letter it may be displayed on the screen and subsequent button touches ignored. If a second button is pressed before a letter is identified an error may be reported. At block 714 the process is repeated if more letters are to be entered. If no more letters are to be entered, the process stops at termination block 716.

If the user selects to enter non-alphabetic letters (symbols), as depicted by the negative branch from decision block 708 in FIG. 7, the user enters symbols using the scrolling device, such as the ring 108 in FIG. 4. The ring is used at block 718 to highlight a symbol from a list or table of symbols displayed on the screen. Once the desired symbol is highlighted, the symbol is selected by clicking the ring or pressing some other "select" or "OK" button at block 720. At block 722 the process is repeated if more symbols are to be entered. If no more symbols are to be entered, the process stops at termination block 724.

Figure 9:
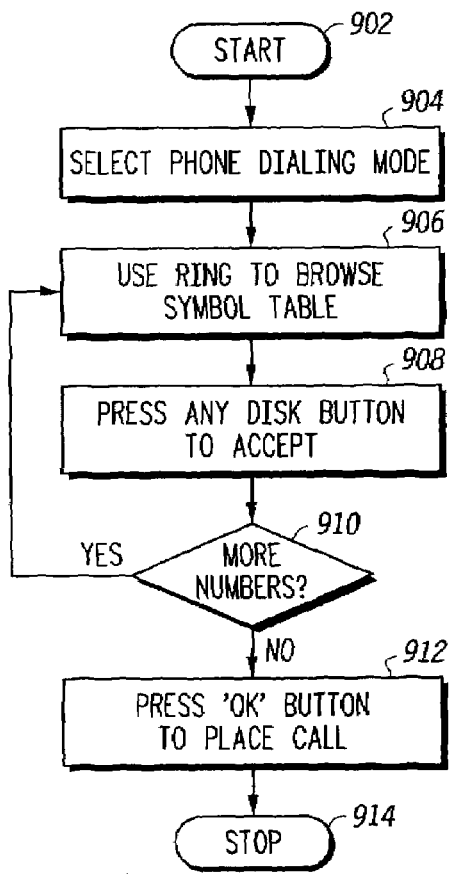
FIG. 9 is a flow chart depicting a method of entering telephone numbers into an electronic device in accordance with the present invention.

The apparatus shown in FIG. 3 and FIG. 4 may be used for a novel method of entering telephone numbers. The method is illustrated in the flow chart of FIG. 9. Following start block 902, the user selects phone dialing mode at block 904. This selection may be achieved by navigation through a menu of options, for example. When phone dialing mode is selected, an image of a rotary telephone dial is displayed on the screen. At block 906, the ring 108 is used to highlight a number on the image of the rotary dial. The ring (or some other button) is then "clicked" at block 908 to select the highlighted number. In this manner, rotation of the ring (or rotation of a finger on the ring) is translated into rotational motion on the screen. At decision block 910 the process is repeated if more numbers are required. If the complete telephone number has been entered, as depicted by the negative branch from decision block 912, the number may be dialed by pressing a designated button, such as an "OK" button. The process terminates at block 914.

Figure 10:
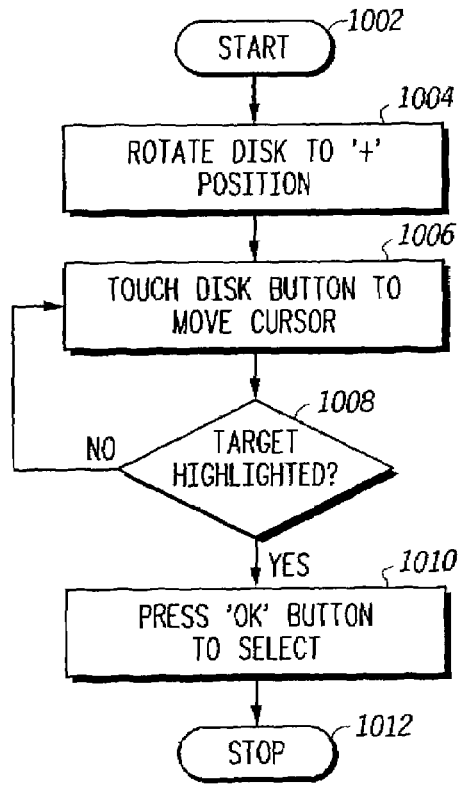
FIG. 10 is a flow chart depicting a method of screen navigation and control in accordance with the present invention.

A flow chart depicting one embodiment of a method of screen navigation in accordance with the present invention is shown in FIG. 10. Referring to FIG. 10, the process begins at start block 1002. At block 1004, the disk, 302 in FIG. 3 and FIG. 4, is rotated to the position shown in FIG. 3. The buttons form a "cross" or "diamond" configuration occupying locations 2, 4, 6 and 8. At block 1006, the user touches a button to move a cursor on the screen. Preferably, the button in positions 2 and 4 move the cursor up and down the screen respectively, while buttons in positions 4 and 6 move the cursor left or right respectively. As depicted by the negative branch from decision block 1008, this process is continued until the cursor is at the target position on the screen. The target is then selected by pressing any of the buttons or by pressing an "OK" button. The process ends at termination block 1012. This same process may be used to manipulate screen objects other than cursors.

The array of buttons is sized to be just large enough that a user may press one button without pressing a neighboring button. The array may be less than one inch across.

Figure 11:
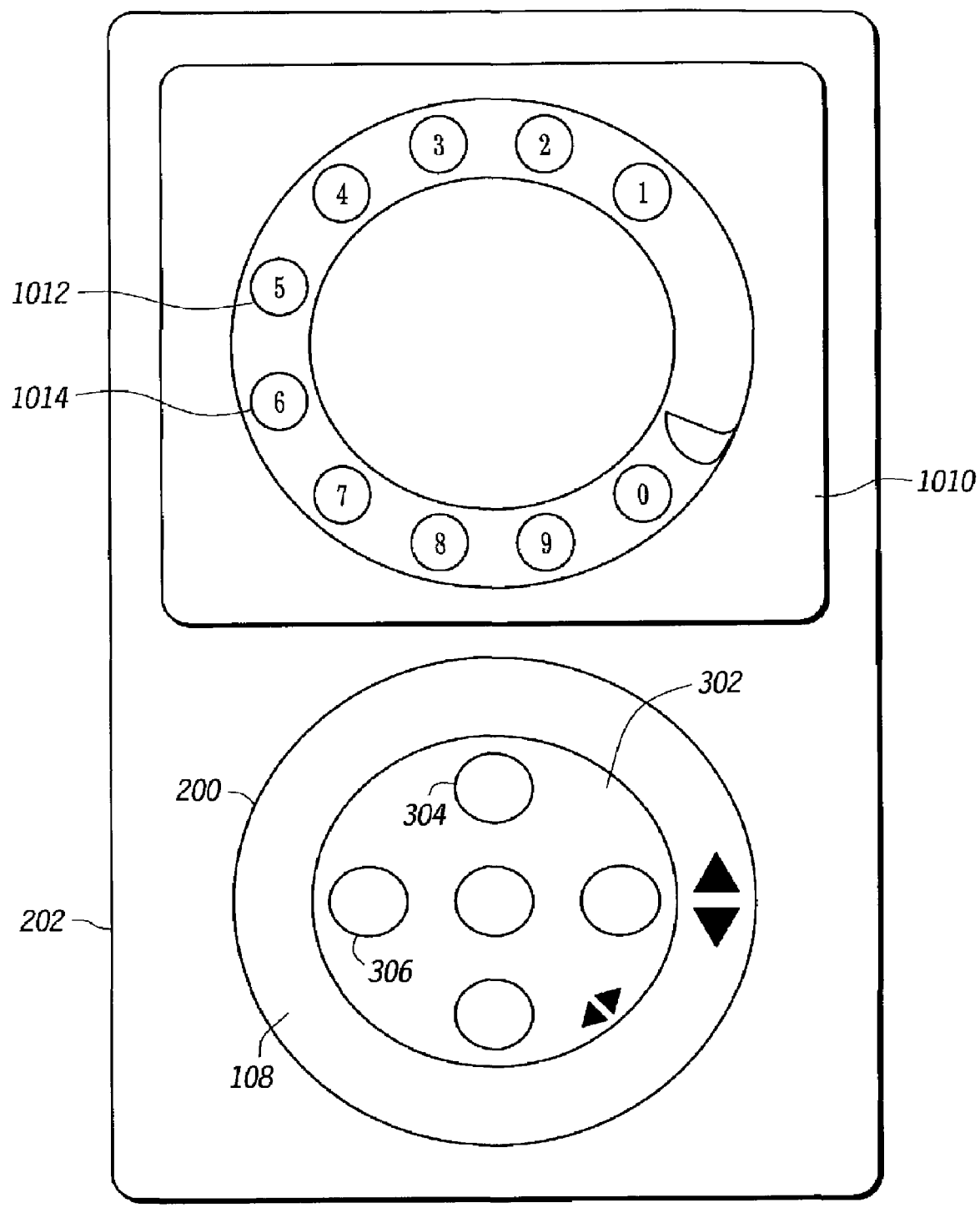
FIG. 11 is a diagram depicting the use of an apparatus of the present invention for telephone dialing.

FIG. 11 is a diagrammatic representation of the use of an apparatus of the present invention for telephone dialing. The electronic device 202 incorporates a display screen 1010. An image of a rotary telephone dial is displayed on the display screen 1010. The image includes numbers 0–9 (1012 and 1014 for example). In one embodiment, the outer ring 108 is rotated to highlight a number on the image, then that number is selected by clicking the ring or pressing an "OK" button. In a further embodiment, the number to be dialed is selected by moving a finger or thumb around a touch sensitive ring until the desired number is highlighted. A similar method can be used, for example, to set the time on a clock or to interact with other rotary images, such as dials or knobs. In many applications, the interaction device is small compared to the screen size. The interaction device in the figure has been enlarged for clarity.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Such variations are contemplated and considered equivalent. While the invention has been particularly shown and described with reference to exemplary embodiments, it will be understood by those skilled in the art that various changes in form and detail may be made therein without departing from the spirit and scope of the invention. In addition, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An interaction device for entering text characters of a plurality of text characters into an electronic device, the interaction device comprising:

an array of text-input buttons, each text-input button begin independently sensitive to touching and pressure; and an array of navigation buttons, each navigation button being independently sensitive to touch and to pressure, wherein each text character of a plurality of text characters is entered by touching one or more buttons of the array of text-input buttons in a predetermined sequence, and wherein each of the navigation buttons moves the position of an object displayed on a display screen in a predetermined direction, and wherein the array of navigation buttons comprises four navigation buttons arranged in a cross pattern at the four corners of a diamond, and wherein the array of four navigation buttons is rotatable through 45° so that four navigation buttons form at least part of the array of text input buttons.

2. An interaction device in accordance with claim 1, wherein the start of the predetermined sequence is indicated by pressing a predetermined button of the array of text-input buttons.

3. An interaction device in accordance with claim 1, wherein a button touch is determined to be the start of the predetermined sequence if the time elapsed since a previous button touch exceeds a threshold.

4. An interaction device in accordance with claim 1, wherein the array of text-input buttons comprises an array of five input text buttons positioned at the four corners and the center of a square.

5. An interaction device in accordance with claim 1, wherein the display screen is incorporated into the electronic device.

6. An interaction device for entering text characters of a plurality of text characters into an electronic device, the interaction device comprising:
   an array of text-input buttons, each text-input button begin independently sensitive to both touch and pressure, wherein each text character of a plurality of text characters is entered by touching one or more buttons of the array of text-input buttons in a predetermined sequence; and
   an array of navigation buttons, each navigation button being independently sensitive to touching and to pressure, wherein each of the navigation buttons moves the position of an object displayed on a display screen in a predetermined direction, and
   wherein the array of text-input buttons comprises an array of five text input buttons and the array of navigation buttons comprises an array of four navigation buttons, and wherein the array of five text input buttons and the army of four navigation buttons are physically distinct buttons arranged in a three-by-three square grid.

7. An interaction device in accordance with claim 6, wherein one array of buttons of the array of five text-input buttons and the array of four navigation buttons is disabled.

8. An interaction device in accordance with claim 6, wherein the one array of buttons that is disabled is physically disabled.

9. An interaction device in accordance with claim 6, wherein buttons of the one array of buttons that is disabled are less brightly illuminated than other buttons.

10. An interaction device in accordance with claim 6, further comprising:
    a scrolling device located in proximity to the array of text-input buttons.

11. An interaction device in accordance with claim 10, wherein the scrolling device is a ring mounted in the plane of the array of text-input buttons.

12. An interaction device in accordance with claim 11, wherein the ring encircles one or more of the text-input buttons.

13. An interaction device in accordance with claim 11, wherein the ring is located in close proximity to the array of text-input buttons.

14. An interaction device in accordance with claim 10, wherein the ring is touch sensitive, producing a signal indicative of the position of the ring that is touched.

15. An interaction device in accordance with claim 10, wherein the ring is rotatable, producing a signal indicative of the position of the ring or the change in position of the ring.

16. An interaction device in accordance with claim 10, wherein the scrolling device is one of a roller and a wheel.

17. An interaction device in accordance with claim 16, wherein the scrolling device is mounted with its axis of rotation in the plane of the array of text-input buttons.

18. An interaction device in accordance with claim 10, wherein the scrolling device is clickable.

19. An interaction device for entering user information into an electronic device, the interaction device comprising:
    a display screen; and
    a rotatable array comprising five buttons,
    wherein, when in a first orientation that is a cross pattern with a center button, each of at least four buttons of the rotatable array moves the position of an object displayed on a the display screen in a predetermined direction, and wherein a second orientation of the rotatable array is an orientation that is rotated 45 degree with reference to the first orientation, and wherein the rotatable array are usable in the second orientation to enter text characters onto the display.

20. An interaction device in accordance with claim 19, wherein each of the five buttons is independently sensitive to touching and pressure in the second orientation, and wherein each text character of a plurality of text characters is entered in the second orientation by touching one or more buttons of the rotatable array of five buttons in a predetermined sequence.

21. A method for entering user information into an electronic device from an interaction device having an array of text-input buttons, each button being sensitive to both pressure and touch, the method comprising:
    determining a first button of the array of text-input buttons and a sequence of one or more second buttons of the array or text-input buttons corresponding to a symbol;
    touching or pressing the first button of the array of text-input buttons;
    touching the one or more second buttons in the sequence of one or more second buttons, wherein the array of text-input buttons comprises an array of five text input buttons located on a rotatable surface;
    rotating the rotatable surface so that the array of five text-input buttons is arranged in a square pattern with one button in each of the four corners of the square and one button in the center of the square, wherein the electronic device incorporates a display screen;
    rotating the rotatable surface so that the array of five text-input buttons is arranged in a diamond pattern with one button in each of the four corners of the diamond and one button in the center of the diamond, the buttons in the four corners of the diamond forming an array of four navigation buttons; and
    touching a button of the array of four navigation buttons to move the position of an object displayed on the display screen in a predetermined direction or highlight a target displayed on the display screen.

22. A method in accordance with claim 21, further comprising:
    clicking a button of the array of four navigation buttons to select a target highlighted on the display screen.

23. A method for entering user information into an electronic device from an interaction device having an array of text-input buttons, each button being sensitive to both pressure and touch, the method comprising:
    determining a first button of the array of text-input buttons and a sequence of one or more second buttons of the array of text-input buttons corresponding to a symbol;
    touching or pressing the first button of the array of text-input buttons;

touching the one or more second buttons in the sequence of one or more second buttons, wherein the electronic device incorporates a display screen and the interaction device includes an array of navigation buttons;

touching a button of the array of navigation buttons to move the position of an object displayed on the display screen in a predetermined direction or highlight a target displayed on the display screen;

selecting the array of text-input buttons or the array of navigation buttons;

disabling the array of navigation buttons if the array of text-input buttons is selected; and disabling the array of text-input buttons if the array of navigation buttons is selected.

24. A method in accordance with claim 23, wherein the disabling of the text-input buttons or the navigation buttons is performed in software.

* * * * *